(12) United States Patent
Ferruccio

(10) Patent No.: US 7,560,423 B2
(45) Date of Patent: Jul. 14, 2009

(54) EASILY WETTABLE POLYCARBOXYLIC THICKENERS

(75) Inventor: Berte Ferruccio, Bergamo (IT)

(73) Assignee: 3V SIGMA S.p.A., Milan (IT)

( * ) Notice: Subject to any disclaimer, the term of this patent is extended or adjusted under 35 U.S.C. 154(b) by 0 days.

(21) Appl. No.: 11/526,724

(22) Filed: Sep. 26, 2006

(65) Prior Publication Data
US 2007/0072788 A1  Mar. 29, 2007

(30) Foreign Application Priority Data
Sep. 27, 2005  (IT) .................. MI2005A001790

(51) Int. Cl.
*C11D 17/06* (2006.01)
*C11D 3/37* (2006.01)
*C11D 9/10* (2006.01)

(52) U.S. Cl. ............ 510/446; 510/361; 510/457; 510/466; 510/475; 510/476; 510/477

(58) Field of Classification Search ........ 510/361, 510/446, 457, 466, 475, 476, 477
See application file for complete search history.

(56) References Cited

U.S. PATENT DOCUMENTS 4,755,560 A * 7/1988 Ito et al. .............. 525/100
2003/0166494 A1* 9/2003 Man et al. ............ 510/466

* cited by examiner

*Primary Examiner*—Brian P Mruk
(74) *Attorney, Agent, or Firm*—Arent Fox LLP

(57) ABSTRACT

Mixtures of acrylic acid homopolymers, acrylic acid copolymers with other olefinically unsaturated carboxylic acids and/or other vinyl monomers, with electrolytes and surfactants, obtained in the form of powders easily wettable in water and with low viscosity of the aqueous dispersions before neutralisation of the free carboxyl groups.

20 Claims, No Drawings

EASILY WETTABLE POLYCARBOXYLIC THICKENERS

FIELD OF INVENTION

This invention relates to mixtures of acrylic acid homopolymers, acrylic acid copolymers with other olefinically unsaturated carboxylic acids and/or other vinyl monomers, with electrolytes and surfactants, obtained in the form of powders easily wettable in water and with low viscosity of the aqueous dispersions before neutralisation of the free carboxyl groups.

BACKGROUND

Said polycarboxylic polymers are known to the prior art. They may be homopolymers of acrylic acid, copolymers of acrylic acid with methacrylic, itaconic, maleic or crotonic acid, copolymers of acrylic acid with methyl, ethyl, propyl or higher esters up to C18-22 of acrylic acid or of methacrylic, itaconic, maleic or crotonic acids, copolymers with other monomers containing a vinyl unsaturation, such as the vinyl esters of linear or branched acids up to C18-20, vinyl esters, and styrene.

Some of these polymers are used in the cosmetic industry under the INCI name of Carbomer.

The homo- and copolymers described above can also be crosslinked with small amounts of ethylenically unsaturated multifunctional monomers such as the allyl ethers of pentaerythritol, trimethylolpropane or sugars.

They are usually prepared by polymerisation in a suitable organic solvent, at atmospheric pressure or a higher pressure in a closed autoclave, using catalysts able to generate free radicals such as peroxides, organic hydroperoxides and azo compounds.

The polymers thus prepared precipitate in the reaction solvent in the form of solid aggregated particles, which are separated from the solvent by filtration and/or direct drying. The powders thus obtained are used as viscosity-controlling agents for aqueous media because they develop very high viscosities after neutralisation.

However, these powders are rather difficult to disperse in water, and sometimes develop an undesirably high viscosity even before neutralisation.

Synthesis processes in the presence of surfactants, generally non-ionic, with hydrophobic-lipophilic balance (HLB) values of between 1 and 12, have been proposed to eliminate these drawbacks. See, for example, U.S. Pat. No. 4,375,533, U.S. Pat. No. 4,419,502 and U.S. Pat. No. 4,420,596.

Interpolymers containing "steric stabilisers", consisting of surfactants constituted by linear block copolymers with the hydrophobic part not less than 50 Angstroms long, or randomly distributed "comb" copolymers, were disclosed more recently in U.S. Pat. No. 5,288,814. Said steric stabilisers are copolymerised with acrylic monomers, and integrated into the polymer chains after polymerisation.

It has now been discovered that an excellent effect of wettability in water and low viscosity of the aqueous dispersion of the polymers to which this invention relates can be obtained more simply with intimate physical mixtures of polymers or copolymers with small amounts of salts and particular surfactants.

SUMMARY OF THE INVENTION

This invention therefore relates to the mixture, in powder form, of the following components:

(a) homopolymers of acrylic acid, copolymers of acrylic acid with methacrylic, itaconic, maleic or crotonic acid, copolymers of acrylic acid with methyl, ethyl, propyl or higher esters up to C18-22 of acrylic acid or of methacrylic, itaconic, maleic or crotonic acids, copolymers with other monomers containing a vinyl unsaturation, such as the vinyl esters of linear or branched acids up to C18-20, vinyl esters and styrene, possibly crosslinked with small amounts of ethylenically unsaturated multifunctional monomers such as the allyl ethers of pentaerythritol, trimethylolpropane or sugars, with (b) suitable water-soluble salts in finely divided form, and (c) silicone surfactants which are soluble or easily dispersible in water.

Powders obtained from the combination of these three components are more easily dispersible in water than polymers (a) alone and combinations thereof with only one of components (b) and or (c).

Easy dispersion of the powders according to the invention is achieved by improving two separate aspects: reduction of the viscosity of the final aqueous dispersion, thickening polymer content being equal, and greater hydration speed of the particles in contact with the liquid.

The fact that the amounts of additives b) and c) are less than the only a small amount of component a) also improves the dispersibility of the powders, without significantly reducing the performance of the thickening polymer after neutralisation.

DETAILED DESCRIPTION

In accordance with this invention, the crosslinked or non-crosslinked acrylic acid homopolymers or copolymers which constitute component a) of the mixture are prepared in the following stages:

(1) dissolution of the monomer or mixture of monomers, and the crosslinkers if any, in a suitable organic solvent, such as methylene chloride, benzene, low-boiling aliphatic hydrocarbons such as hexane or cyclohexane, lower esters such as methyl or ethyl acetate or mixtures of said solvents, (2) addition of polymerisation initiators such as lauroyl peroxide, dicetyl peroxydicarbonate, benzoyl peroxide and the like, (3) heating at ambient pressure and at the temperature required by the nature of the monomers and polymerisation initiators used, or at a pressure exceeding ambient pressure in a closed reactor, until polymerisation is complete, (4) addition of 0.1 to 5.0% of a water-soluble salt, calculated on the weight of the monomer or mixture of monomers, and of 0.1 to 3.0% of a silicone surfactant which is soluble or easily dispersible in water, again calculated on the total weight of the monomers, (5) evaporation of the solvent until dry to obtain the polymer in the form of a fine powder easily dispersible in water.

Alternatively, the sequence of stages (4) and (5) could be reversed, so that at the end of polymerisation in stage (3), the polymer is first separated from the solvent by direct evaporation of the solvent or by filtration of the solvent and subsequent drying, and the salt and surfactant are then added to the polymer powder and mixed thoroughly.

The process whereby the salt and surfactant are added to the polymer before its separation from the solvent is preferred, because it guarantees more thorough dispersion and homogeneity of the mixture.

The ether allyls allyl ethers of sugars used to crosslink the polycarboxylic polymer are allyl ethers of sugars chosen from the group comprising saccharose, fructose, glucose and sorbitol. Saccharose is particularly preferred.

The salts constituting component (b) are salts of alkaline and alkaline earth metals and ammonia salts or salts of water-soluble amines, preferably the sodium, potassium and ammonium salts of anions such as chlorides, sulphates, phosphates, acetates, formates and methanesulphonates. For the purposes of this invention, it is important for the salts to be in a finely divided form with a particle size of under 500 microns, and preferably under 100 microns.

The surfactants constituting component (c) are silicone surfactants which are soluble or easily dispersible in water, and are preferably constituted by a hydrophobic chain of polymethylsiloxane to which are bonded one or more hydrophilic chains of polyalkylene glycol, possibly terminated with alkyl groups (e.g. methyl, ethyl and higher homologues), acyl groups (e.g. the lactate group) or ionic groups (e.g. phosphate or sulphate groups).

The polyalkylene glycol chains can be in the terminal position on the polysiloxane chain, or be distributed in blocks or at random along said polysiloxane chain, or can be grafted in several positions along the chain, according to the polymer grafting technique.

The polyalkylene glycol chain may be derived by random or block homopolymerisation or copolymerisation of lower epoxides such as ethylene, prolylene or butylene oxide.

These surfactants have a turbidity point of at the concentration 1% in water over 30° C., and preferably over 40° C., and an HLB value (represented by the percentage of polyalkylene glycol divided by five) which is greater than 7, and preferably greater than 10.

Mixtures of the surfactants described above can also be used for the purposes of this invention.

Some names (INCI names) of these types of polymer surfactants are: DIMETHICONE COPOLYOL, PEG-8 DIMETHICONE, PEG-12 DIMETHICONE, PEG/PPG 20/15 DIMETHICONE, PEG/PPG 15/15 DIMETHICONE, PEG/PPG 25/25 DIMETHICONE, DIMETHICONE PEG-7 PHOSPHATE and DIMETHICONE PEG-7 LACTATE.

The examples below more particularly illustrate the invention:

EXAMPLE No. 1

1-a—Preparation of a Mixture According to the Invention 79.12 g of acrylic acid, 0.88 g of pentaerythritol triallyl ether and 0.60 g of bis-(ter-butyl-cyclohexyl)-peroxydicarbonate are dissolved in 790 g of methylene chloride. The solution is cascade heated refluxed under nitrogen for 12 hours. 1.60 g of finely ground sodium chloride (<100 microns), and 0.4 g of a surfactant consisting of heptamethyltrisiloxane grafted with polyoxymethylene chains constituting 40% of the total weight of the surfactant, are added under agitation to the fine dispersion of polyacrylic acid thus obtained. The solvent is then removed by distillation in a rotary evaporator at low pressure, and 82.6 g of crosslinked polyacrylic acid in the form of a white powder easily wettable in water is obtained.

Comparison Tests 1-b

The polymerisation described in 1-a is repeated, without the addition of sodium chloride and polysiloxane surfactant. After evaporation of the solvent, 80.6 g of polymer in the form of a white powder is obtained.

1-c

The polymerisation described in 1-a is repeated, without the addition of sodium chloride. After evaporation of the solvent, 81 g of polymer in the form of a white powder is obtained.

1-d

The polymerisation described in 1-a is repeated, omitting the polysiloxane surfactant only. After evaporation of the solvent, 82.2 g of polymer in the form of a white powder is obtained.

1-e Efficacy Tests

The four samples of polycarboxylic polymer obtained were compared, and the wettability in water and viscosity of 0.5% and 3% (in weight) aqueous dispersions was evaluated.

"Wettability" was evaluated on the basis of the time taken for the polymer powder to be deposited on the base bottom of the test vessel, by placing 1 g on the surface of 200 ml of water in a 250 ml beaker, without agitation.

The following valuation scale was used:

good wettability: the powder sinks totally within the first 5 minutes;

average wettability: the powder partly sinks within the first 5 minutes and totally sinks within the first 10 minutes;

low wettability: the powder partly sinks within the first 10 minutes;

poor wettability: hardly any of the powder sinks within the first 10 minutes.

The viscosity is expressed in cps measured after 25 minutes' agitation of 300 g of 0.5% and 3% aqueous dispersions, measured with a Brookfield RVT viscosimeter at 20 rpm and 25° C.

|  | test 1-a | test 1-b | test 1-c | test 1-d |
| --- | --- | --- | --- | --- |
| wettability | good | poor | low | average |
| 0.5% viscosity | <50 | 650 | 600 | <50 |
| 3% viscosity | 1900 | 40000 | 38000 | 2500 |

EXAMPLE No. 2

A 12% suspension in methylene chloride of acrylic acid/trialkylacetic acid vinyl ester copolymer was prepared according to example 1-b in Belgian patent 903,354.

The suspension was divided into four parts, to each of which was added:

2-a: 3.5% anhydrous sodium sulphate and 0.6% PEG-8 dimethicone (INCI name) calculated as a proportion of the polycarboxylic polymer;

2-b: no additive;

2-c: 0.6% PEG-8 dimethicone only, calculated as a proportion of the polycarboxylic polymer;

2-d: 3.5% anhydrous sodium sulphate, calculated as a proportion of the polycarboxylic polymer.

The following table 2 summarises the measurements taken according to the criteria described in example no. 1:

|  | test 2-a | test 2-b | test 2-c | test 2-d |
| --- | --- | --- | --- | --- |
| wettability | good | poor | poor | low |
| 0.5% viscosity | <50 | 2000 | 2300 | <50 |
| 3% viscosity | <50 | 32000 | 28000 | 60 |

EXAMPLE No. 3

50 g of an acrylic acid/stearyl acrylate copolymer (INCI name: Acrylates/C10-30 alkyl acrylate crosspolymer) was thoroughly mixed with:

3-a: 1% in weight of sodium chloride and 3% in weight of surfactant with the INCI name PEG/PPG 15/15 DIMETHICONE;

3-b: no additives;

3-c: 3% in weight of surfactant called INCI PEG/PPG 15/15 DIMETHICONE;

3-d: 1% in weight of sodium chloride.

The following table 3 summarises the measurements taken according to the criteria described in example no. 1:

|  | test 3-a | test 3-b | test 3-c | test 3-d |
|---|---|---|---|---|
| wettability | good | poor | low | average |
| 0.5% viscosity | <50 | 100 | 60 | <50 |
| 3% viscosity | 100 | 11000 | 8200 | 110 |

The invention claimed is:

1. Mixtures in the form of powders easily wettable in water, comprising:
   (a) polycarboxylic copolymers or homopolymers of acrylic acid crosslinked with allyl ethers of pentaerythritol, trimethylolpropane or sugars;
   (b) water-soluble inorganic or organic salts in finely divided form; and
   (c) silicone surfactants which are soluble or easily dispersible in water.

2. Mixtures as claimed in claim 1, wherein the polycarboxylic polymer is a copolymer of acrylic acid with vinyl esters of linear or branched carboxylic acids C4 to C12.

3. Mixtures as claimed in claim 1, wherein the polycarboxylic polymer is a copolymer of acrylic acid with acrylic esters of linear or branched alcohols C8 to C22.

4. Mixtures as claimed in claim 1, wherein the water-soluble inorganic or organic salts are chosen from among sodium, potassium and ammonium salts of anions such as chlorides, sulphates, phosphates, acetates, formates and methanesulphonates.

5. Mixtures as claimed in claim 1, wherein the water-soluble inorganic or organic salts are present in the amount of 0.1 to 5% in weight of the carboxylic polymer.

6. Mixtures as claimed in claim 1, wherein the silicone surfactants which are soluble or easily dispersed in water have an HLB value of not less than 7, and possess a hydrophobic polysiloxane chain to which one or more polyalkyleneglycol-based hydrophilic chains are bonded.

7. Mixtures as claimed in claim 1, wherein the sugars are chosen from among saccharose, fructose, glucose and sorbitol.

8. Mixtures as claimed in claim 7, wherein the sugar is saccharose.

9. Process for the preparation of the mixtures claimed in claim 1, wherein the inorganic salts and surfactants are added to a suspension of polymer in a solvent which is subsequently evaporated.

10. Process for the preparation of the mixtures claimed in claim 1, wherein the inorganic salts and surfactants are added to the polymer in the form of a dry powder with subsequent homogenisation.

11. Mixtures as claimed in claim 1, wherein the silicone surfactants comprise a hydrophobic chain of polymethylsiloxane to which are bonded one or more hydrophilic chains of polyalkylene glycol.

12. Mixtures as claimed in claim 11, wherein one or more of the chains of polyalkylene glycol are terminated with at least one of an alkyl group, an acyl group and an ionic group.

13. Mixtures as claimed in claim 1, wherein the silicone surfactants comprise a polymeric surfactant selected from the group consisting of DIMETHICONE COPOLYOL, PEG-8 DIMETHICONE, PEG-12 DIMETHICONE, PEG/PPG 20/15 DIMETHICONE, PEG/PPG 15/15 DIMETHICONE, PEG/PPG 25/25 DIMETHICONE, DIMETHICONE PEG-7 PHOSPHATE and DIMETHICONE PEG-7 LACTATE, and any combination thereof.

14. Mixtures as claimed in claim 1, wherein the silicone surfactants comprise heptamethyltrisiloxane grafted with polyoxymethylene chains constituting 40% of the total weight of the surfactant.

15. Mixtures as claimed in claim 1, wherein the silicone surfactants comprise PEG-8 dimethicone.

16. Mixtures as claimed in claim 1, wherein the silicone surfactants comprise PEG/PPG 15/15 DIMETHICONE.

17. Mixtures as claimed in claim 1, wherein the water-soluble inorganic or organic salts are chosen from among sodium, potassium and ammonium salts of anions selected from the group consisting of chlorides, phosphates, acetates, formates, methanesulphonates, and any combination thereof.

18. Mixtures in the form of powders easily wettable in water, comprising:
   (a) a polyacrylic acid formed from acrylic acid, pentaerythritol triallyl ether and bis-(ter-butyl-cyclohexyl)-peroxyd icarbonate;
   (b) finely ground sodium chloride; and
   (c) a surfactant consisting of heptamethyltrisiloxane grafted with polyoxymethylene chains constituting 40% of the total weight of the surfactant.

19. Mixtures in the form of powders easily wettable in water, comprising:
   (a) acrylic acid/trialkylacetic acid vinyl ester copolymer;
   (b) anhydrous sodium sulphate in finely divided form; and
   (c) PEG-8 dimethicone.

20. Mixtures in the form of powders easily wettable in water, comprising:
   (a) Acrylates/C10-30 alkyl acrylate crosspolymer;
   (b) sodium chloride in finely divided form; and
   (c) PEG/PPG 15/15 DIMETHICONE.

* * * * *